H. I. DILTS.
WATER METER.
APPLICATION FILED MAR. 18, 1910.
966,316.
Patented Aug. 2, 1910.
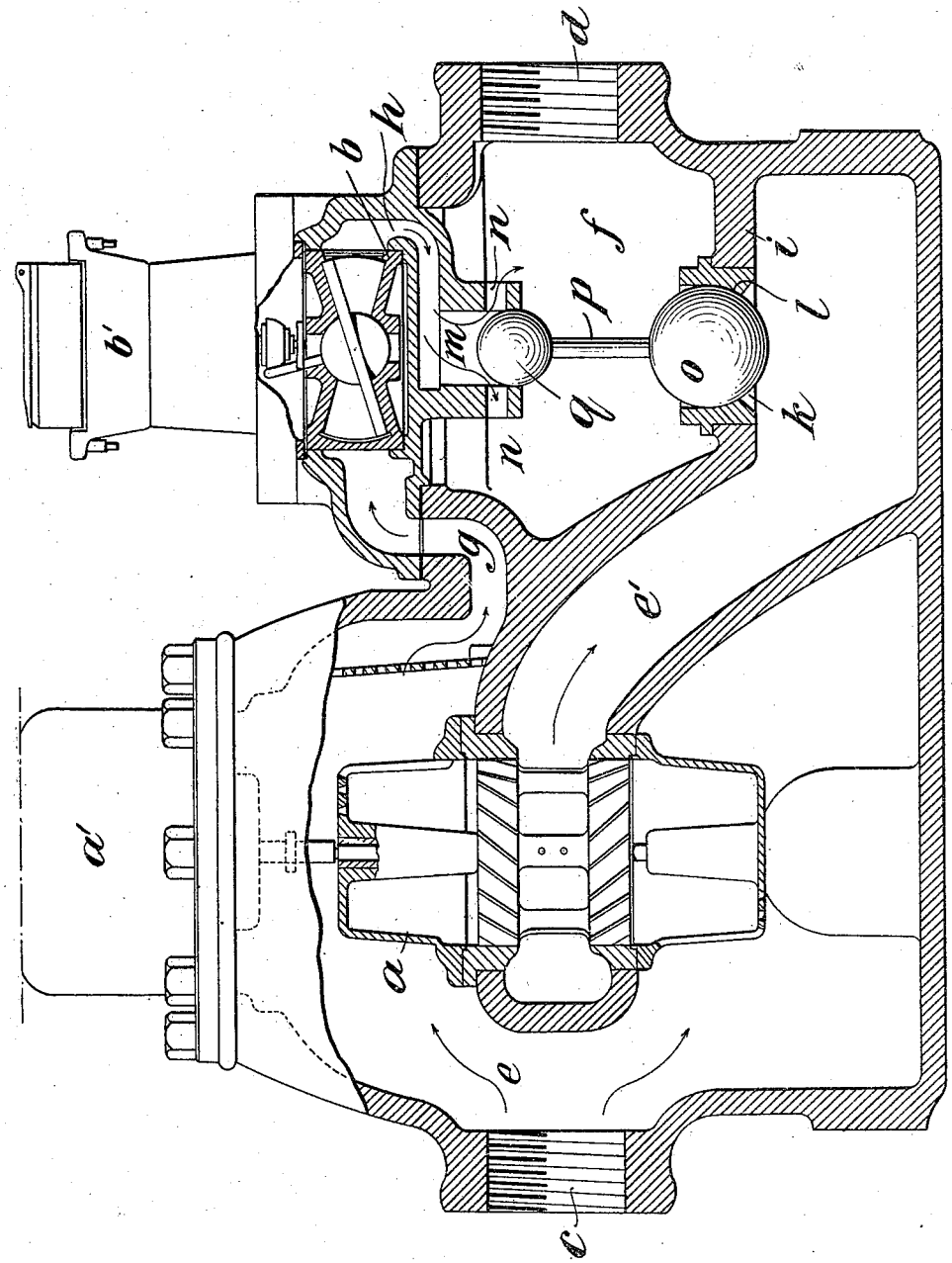
Attest:
Inventor:
Henry I. Dilts
by Redding, Greeley & Austin
Attys.

UNITED STATES PATENT OFFICE.

HENRY I. DILTS, OF NEW YORK, N. Y., ASSIGNOR TO NEPTUNE METER COMPANY, OF NEW YORK, N. Y., A CORPORATION OF NEW JERSEY.

WATER-METER.

966,316.  Specification of Letters Patent.  Patented Aug. 2, 1910.

Application filed March 18, 1910. Serial No. 550,255.

*To all whom it may concern:*

Be it known that I, HENRY I. DILTS, a citizen of the United States, residing in Long Island City, in the borough of Queens of the city of New York, in the State of New York, have invented certain new and useful Improvements in Water-Meters, of which the following is a specification, reference being had to the accompanying drawing, forming a part hereof.

This invention relates to compound water meters in which a high-duty metering device and a low-duty metering device are combined, a valve, operated by variations in the pressure differential, acting to permit the flow through one of such meters, and to prevent the flow through the other of such meters, and it is particularly concerned with the construction of the valve by which the flow through one meter or the other is determined.

The valve which forms the subject of this invention is designed with particular reference to the keeping of the valve seat or seats free from hard particles which might prevent a proper seating of the valve and the avoidance of liability of the valve to stick or bind.

The invention will be more fully explained hereinafter with reference to the accompanying drawing which presents a view, partly in elevation and partly in vertical section, of a compound meter which embodies the invention.

As in the structure represented in the drawing, the relatively high-duty metering device $a$ and the relatively low-duty metering device $b$, are preferably, although not necessarily, combined in a single structure. These metering devices, moreover, may be of any suitable character, the metering device $a$ being shown as of the turbine type, which is well adapted to register accurately large flows of liquid, while the metering device $b$ is of the nutating disk type, which is well adapted to register accurately small flows of liquid. The metering devices are respectively provided, as usual, with registering mechanisms, as at $a'$ and $b'$. In the structure shown, there is a common inlet or inflow opening for the liquid at $c$ and a common outlet or outflow at $d$. The liquid which enters at the inlet $c$ passes into a chamber $e$ from which, according to the position of the valve hereinafter referred to, it flows either through that branch of the common conduit which includes the high-duty metering device $a$ and the channel $e'$, into the chamber $f$, whence it escapes through the outlet $d$, or through that branch which includes the channel $g$, the low-duty metering device $b$ and the channel $h$, into the chamber $f$. Between the channel $e'$ and the chamber $f$ is a diaphragm or wall $i$ having an opening $k$ fitted with a spherical valve seat $l$, while the channel $h$, from the low-duty meter, terminates in a port $m$, preferably cylindrical, the walls of which are extended below the lateral outlet ports $n$ to form a guide. A spherical valve body $o$ coöperates with the spherical valve seat $l$ and is rigidly connected by a stem $p$ with a valve body $q$, which is also preferably spherical. The distance between centers of the valve bodies $o$ and $q$ and the distance between the valve seat $l$ and the lateral ports $n$ are such that when the valve body $o$ rests on its seat, the valve ports $n$ are unobstructed by the valve body $q$, and that when the valve body $o$ is lifted from its seat, as by a substantial increase in the pressure differential, the valve ports $n$ are closed by the valve body $q$. The two valve bodies are fixedly united by the stem $p$ and control respectively the two branches through one or the other of which the liquid may flow from the inlet to the outlet of the compound meter.

It will now be seen that when the flow of liquid is relatively small, the valve body $o$ rests on its seat and prevents the flow of water through the high-duty meter $a$, while the valve body $q$ is in such position as to permit the flow of water through the low-duty meter; and that, when the flow of liquid through the inlet $c$ increases and the difference of pressure between the inlet and the outlet increases to a substantial degree, the valve body $o$ will be lifted from its seat, permitting the flow of liquid through the high-duty meter and the valve body $q$ will be moved to close the ports $n$ preventing the further flow of liquid through the low-duty meter until the pressure differential decreases to such an extent as to permit the valve body $o$ to rest again upon its seat. It will be understood, of course, that the valve seat $l$ is cylindrical internally above the spherical portion of the seat for a sufficient distance to require a sufficient movement of the compound valve to close or open the passage through the port $m$, as the case may be. The sphericity of the valve seat $l$ and of its coöperating valve body $o$ affords no lodgment for hard particles, as of sand, such as would prevent the proper seating of a valve with a flat flange, while the sphericity of the valve body $q$ permits such freedom of movement as the valve body $o$ may have when it is lifted from its seat without any tendency of the parts to jam or bind.

I claim as my invention:

1. The combination of a relatively high-duty meter, a relatively low-duty meter, a common conduit having branches in which the two meters are respectively located, the inflow and the outflow being common to both branches, one of such branches having a spherical valve seat and the other of said branches having a straight port with lateral outlets, a spherical valve body for coöperation with the spherical valve seat, a valve body for coöperation with the straight valve port fixedly united with the spherical valve body and means connecting the valve bodies to move together, whereby when one valve body is in position to close one branch, the other valve body is in open position to permit flow through the other branch.

2. The combination of a relatively high-duty meter, a relatively low-duty meter, a common conduit having branches in which the two meters are respectively located, the inflow and the outflow being common to both branches, one of such branches having a spherical valve seat and the other of said branches having a straight cylindrical port with lateral outlets, a spherical valve body for coöperation with the spherical valve seat, a spherical valve body for coöperation with the straight cylindrical port and means connecting the valve bodies to move together, whereby when one valve body is in position to close one branch, the other valve body is in open position to permit flow through the other branch.

This specification signed and witnessed this 11th day of March, A. D. 1910.

HENRY I. DILTS.

Signed in the presence of—
ELLA J. KRUGER,
AMBROSE L. O'SHEA.